UNITED STATES PATENT OFFICE.

EDWIN BATTLEY, OF MONT CLAIR, NEW JERSEY, ASSIGNOR TO HIMSELF AND JAMES CRANE, OF SAME PLACE.

IMPROVEMENT IN THE MANUFACTURE OF VARNISH.

Specification forming part of Letters Patent No. 54,461, dated May 1, 1866; antedated April 16, 1866,

*To all whom it may concern:*

Be it known that I, EDWIN BATTLEY, of Mont Clair, in the county of Essex and State of New Jersey, have invented a new and Improved Varnish Composition; and I do hereby declare that the following is a full, clear, and exact description thereof, which will enable those skilled in the art to make and use the same.

My invention relates to a varnish composition in which creosote or carbolic acid is used as the solvent of the gums used, whereby a great many varnishes can be made entirely without heat, and much danger and loss from fire is avoided, and also much labor and expense saved.

In preparing my varnish I use, for instance, rosin, and dissolve it in creosote or carbolic acid, the quantity of the liquid being varied according to the strength of the varnish desired. If varnish made in this manner is mixed with lamp-black, without the addition of any other oil, a superior printer's ink is obtained, which is cheaper than ordinary ink, which works very easy, and gives an impression that is not liable to rub off or lose its blackness.

Instead of rosin a great variety of gums may be dissolved in creosote or carbolic acid with or without heat, and varnishes can thus be made of different colors and suitable for varnishing tinware, wood, or other articles.

What I claim as new, and desire to secure by Letters Patent, is—

1. A varnish compound in which creosote or carbolic acid is used as the solvent of the gum, such as rosin, substantially as set forth.

2. The composition of a rosin dissolved in carbolic acid with lamp-black, substantially in and for the purpose specified.

The above specification of my invention signed by me this 23d day of September, 1865.

EDWIN BATTLEY.

Witnesses:
 M. M. LIVINGSTON,
 W. HAUFF.